Jan. 4, 1938. J. KISS 2,104,230
LICENSE PLATE CARRIER
Filed April 16, 1937 2 Sheets-Sheet 1
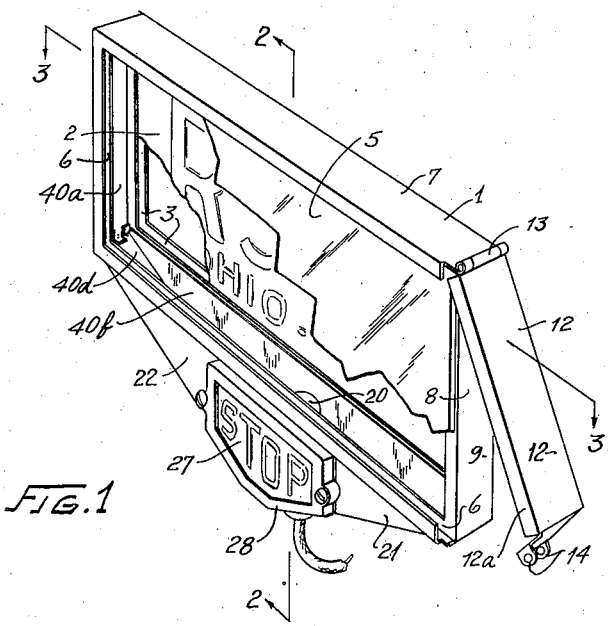
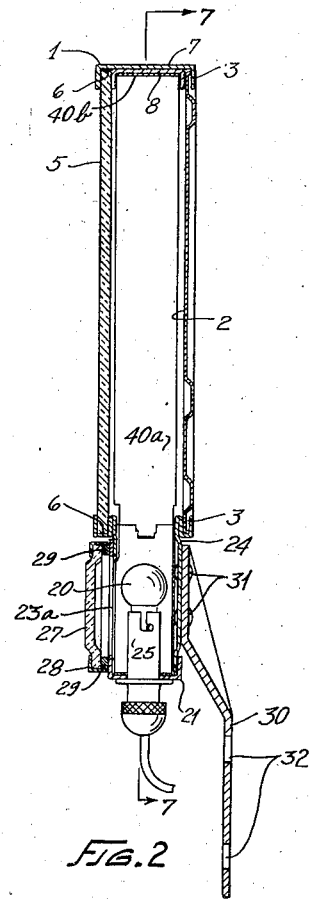
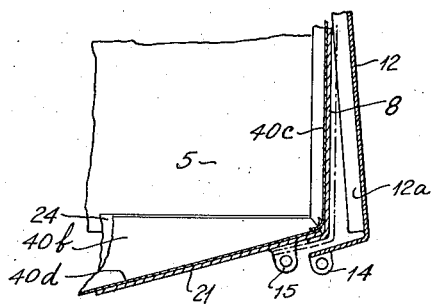
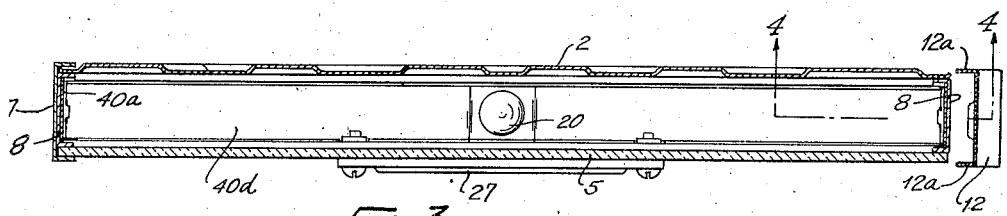
INVENTOR.
BY John Kiss,
Bates, Gohrick & Fear
ATTORNEYS.

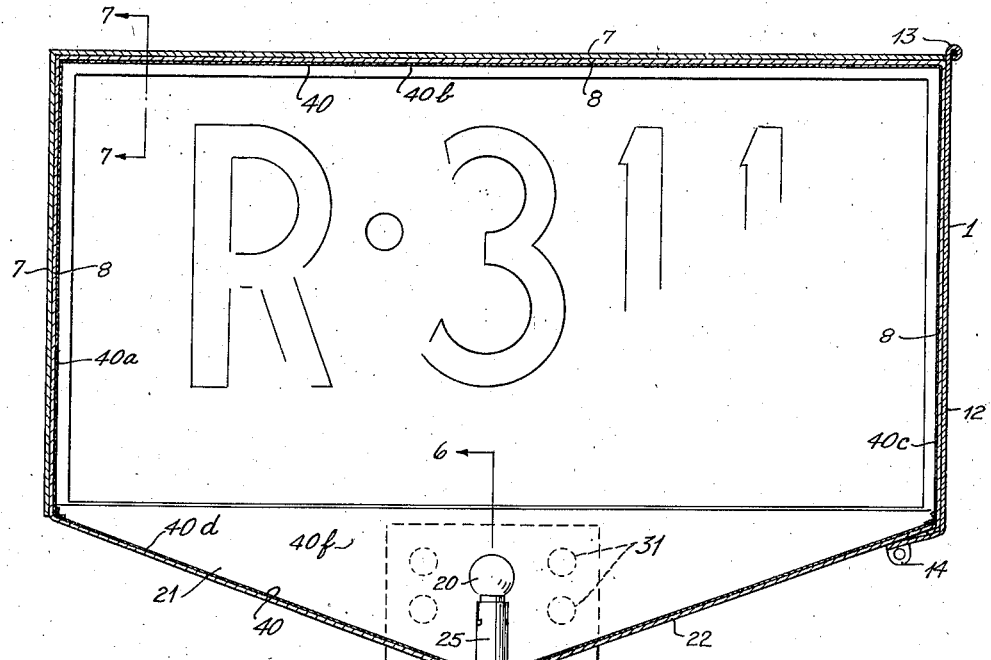
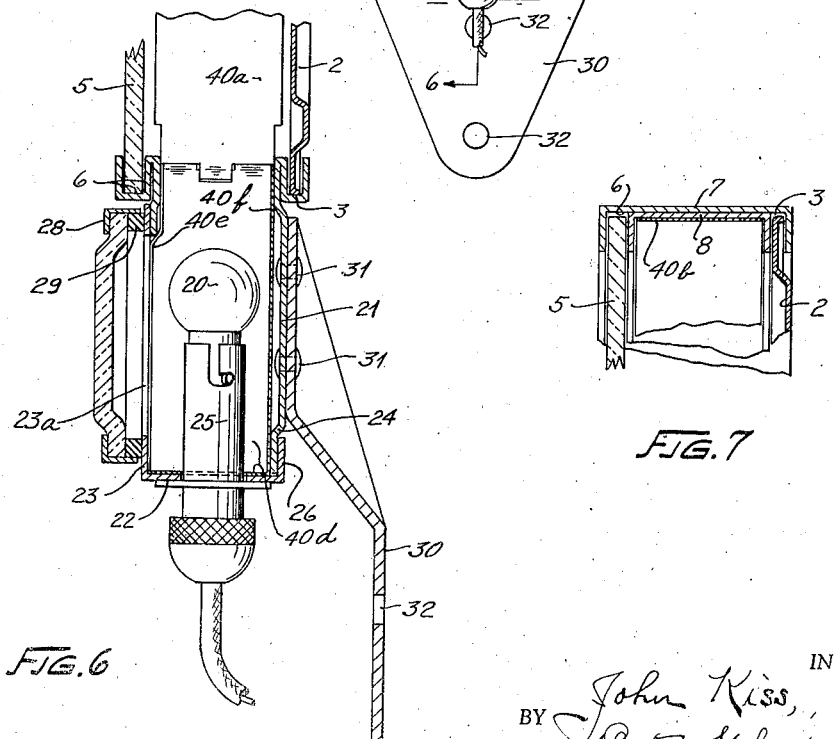

Patented Jan. 4, 1938

2,104,230

UNITED STATES PATENT OFFICE 2,104,230

LICENSE PLATE CARRIER

John Kiss, Cleveland, Ohio

Application April 16, 1937, Serial No. 137,266

3 Claims. (Cl. 40—132)

This invention relates to a device for supporting and displaying license plates for vehicles; and the general object is to provide a more effective device of such character than heretofore available.

A specific object is to provide a simple and inexpensive device for displaying prominently, particularly at night, a vehicle license plate or the like.

Other objects include the provision of a combination license plate mounting and illuminating device for vehicles; a display device whereby all portions of the matter to be displayed are at all times more uniformly visible than by prior arrangements directed to such and similar purposes; and a license plate supporting and illuminating device which may be made economically and sold as part of a vehicle, and on which standard plates may be mounted quickly and secured effectively against tampering and theft.

Other objects and features of the invention will become apparent from the following description, relating to the accompanying drawings, showing the preferred form. The essential characteristics are summarized in the claims.

The usual means for displaying license plates on vehicles requires painstaking effort in mounting the plates and dismounting them when it is necessary to change them; and the identity of the plates is not easily recognizable at night even on fairly well lighted thoroughfares. Moreover, the plates can be stolen or tampered with too easily to serve the best interests of society in reducing crime by making unauthorized driving of vehicles hazardous to the criminal. Practice of the present invention makes it possible to mount and dismount license plates quickly by authorized persons; makes tampering with the plates by unauthorized persons difficult; and tends to prevent concealment of the license characters from the proper officials, particularly at night.

Referring briefly to the drawings, Fig. 1 is a perspective view of the device; Fig. 2 is a vertical transverse sectional view taken substantially as indicated by the line 2—2 on Fig. 1; Fig. 3 is a sectional plan view in a horizontal plane, taken substantially along the line 3—3 on Fig. 1; Fig. 4 is a fragmentary sectional view, taken on a plane such as indicated by the line 4—4 on Fig. 3; Fig. 5 is a longitudinal sectional view of the device, taken on a vertical plane such as indicated by the line 5—5 on Fig. 2; Fig. 6 is a relatively enlarged fragmentary sectional view, taken on a vertical plane, as indicated by the line 6—6 on Fig. 5, and Fig. 7 is a sectional view through an upper portion of the casing, as indicated by the line 7—7 on Fig. 5.

Terms such as "front" and "rear", "right" and "left", as used below, refer to the device as shown on the drawings, and are not by way of limitation, either in the specification or the claims.

Referring further to the drawings, 1 indicates a rectangular, box-like casing, which may be made, for example, principally from sheet metal, in as many pieces as necessary, such pieces being welded or otherwise permanently secured together, with the idea of making disassembly difficult. The casing supports the license plate 2 which is preferably insertable into place through one end wall of the casing and forms the principal portion of the back wall. The plate, as shown, occupies a slideway formed by appropriate upper and lower horizontal slideways 3 for the upper and lower edges of the plate, which slideways may be formed as described below. The slideways 3 open at the right of the casing, as shown, to permit the plate to be slid into place against the end wall at the left, which is permanently closed.

The license plate is displayed through a transparent front wall which may comprise a panel 5 of glass or other transparent material. Such panel may be shatter-proof glass or e. g., cellulose material which is fairly tough and sufficiently heavy to make it difficult to remove it or break through it. The panel 5 is insertable into the casing from right to left, the slideway for it being designated 6 in the various figures.

In the particular construction shown (referring particularly to the upper part of the casing) there are outer and inner, wide and narrow channel shaped sheet metal members 7 and 8 respectively in nested relationship and secured together with their flanges turned inwardly, so that the flanges of the two channel members form the slideways 3 and 6 for the license plate and transparent panel and a channel shaped abutment for the plate and panel at the left of the casing. The construction just referred to applies, specifically, only to the left hand end of the casing (Figs. 1, 3 and 5 for example) and the top wall. At the right, the inner channel 8 extends downwardly forming a fixed end wall 9 as shown particularly in Fig. 1. The outer channel 7 terminates approximately at said end wall, and the metal of its web forms part of a hinge 13.

Adjacent the vertical portion 9 of the casing (Fig. 1) the right hand end of it is arranged to be closed by a door 12 suspended from the hinge 13. The door may be made as a channel with flanges 12a directed to overlap the front and back of the casing; (the license plate and transparent panel); and may be swung to permit access to the slideways for the plate and transparent panel. The door may have any appropriate arrangement for locking it. For example, apertured ears 14 on a portion of the door which underhangs the bottom, and ears 15 on such bottom, may cooperate to receive a padlock or sealing cable, or other securing means.

Referring now to the means for illuminating the license plate, this includes, as shown, a light 20, Figs. 2, 5 and 6, in a sub-casing portion 21. The sub-casing may form, in effect, a channel, the web 22 of which is the bottom; and the flanges 23 and 24 are the front and rear walls. The bottom slopes upwardly toward each end, as shown, particularly in Fig. 5, so that ample space is provided at the center, for the light 20 and its mounting 25. There may be any desired larger number of such lights.

In the actual construction illustrated, the front wall and bottom of the sub-casing as well as the slideway for the transparent panel comprise one piece of sheet metal bent to form the elements indicated, as shown clearly in Fig. 6. Similarly, the rear wall 24 is part of a sheet metal section bent to form also the lower slideway portion 3 for the license plate. The two sections are secured together at the rear face of the sub-casing, as at 26, by overlapping parts of the two sections; see Fig. 6. The end portions of the sub-casing may be suitably joined to the lower portion of the upper casing structure, as to the lower ends of the inner channel member 8, as by solder or welding overlapping parts of the various members. The top of the sub-casing is entirely open between the license plate 2 and transparent panel 5 as can be seen in Figs. 2, 5 and 6.

The front wall 23 of the sub-casing is open at 23a and has a suitable transparent lens 27 mounted across the opening as by a frame and gasket 28 and 29 (Figs. 1, 2 and 6). The light may thus serve as a tail light. In case of mounting the device, for example, on the front of an automobile, the opening 23a and lens construction can be omitted. The sub-casing 21 may also house any other appropriate signal lights such as a stop light, right and left-hand turn-indicating lights, etc.

The casing may be mounted on the vehicle as by a bracket 30, attached as at 31 to the sub-casing portion 21. Such bracket may have holes 32 for receiving bolts or screws for attachment of the device to the vehicle body or frame, in case the device is sold as an accessory; or the bracket may be permanently welded to such body or frame, in case the device is made and sold as a part of such vehicle.

For illuminating the characters and background of the license plate, the light shines onto reflector surfaces preferably arranged as follows: Strips 40 having the reflective surfaces (e. g., bright metal) preferably extend entirely around the inside narrow walls of the casing as at 40a, 40b and 40c and across the bottom, front and rear walls of the sub-casing as at 40d, 40e and 40f. As an alternative construction, the surfaces of the various casing members described, e. g., the inside faces of the channel 8 and the sub-casing portions 22, 23 and 24, may be plated and polished. Light reflected by the top and end walls is further reflected by the bright surfaces on the bottom, front and rear walls of the sub-casing, so that the characters on the license plate (see Fig. 5) are illuminated, principally by reflected light. Such characters are thus made to stand out unusually prominently; and at night can be discerned clearly from a surprisingly great distance.

The reflecting surfaces at the inner edge portions of the casing may be made irregular or suitably faceted so that the light is diffused and caused to illuminate the characters and throw them into sharp contrast with respect to the background of the license plate, more uniformly than if the reflecting surfaces are smooth. For instance, I have used wrinkled, bright metal foil to this end, with surprisingly good results. Such foil could be merely stuck onto or otherwise secured to the inside walls of the casing indicated.

In the daytime the device operates to display effectively the identity of the plate, notwithstanding its position inside a casing, principally because of the reflective character of the end and bottom wall surfaces of the casing acting on the light of the sky. In practice, the window panel 5 is usually kept clear because of being part of the vehicle and washed whenever the vehicle is washed.

I claim:

1. A device for displaying license plates and the like on vehicles comprising a casing formed in part by nested outer and inner channels, the inner one of which extends around three sides of the casing and has its flanges turned inwardly, the other channel having its flanges turned inwardly to form with the aforesaid flanges retaining channel effects for the plate to be displayed, a hollow sub-casing joined to one of the channels, the interior of which communicates upwardly with the space embraced by the inner channel, reflecting surfaces on the web portion of the inner channel, facing said space, and a light source in the sub-casing arranged to illuminate said surfaces, thereby to illuminate such plate.

2. A device for displaying conventional opaque license plates for vehicles, comprising a generally rectangular flat casing which is open at the back for substantially its full height and breadth, means to removably support such license plate at the rear portion of the casing so that it is exposed through said back, the top and side walls of the casing relatively overhanging the plate adjacent its identifying face, a sub-casing portion below the plate having front, rear and bottom walls connected to lower portions of the rectangular casing, the sub-casing being open at the top, means for mounting a light in the sub-casing, some of the wall surfaces of the sub-casing being of light reflective character to direct rays from such light upwardly for illuminating the plate, and a bracket for supporting the device on a vehicle, said bracket being secured rigidly to a wall portion of the sub-casing.

3. A device for displaying conventional opaque license plates for vehicles, comprising a generally rectangular flat casing which is open at the back sufficiently to expose the plate for inspection while blocking its removal rearwardly, there being overlapping flanges at the top, bottom, and side walls of the casing relatively overhanging the plate adjacent its identifying face and blocking its removal edgewise, a sub-casing portion below the plate enclosing a space which is open at the top, a light in the sub-casing exposed to said walls and the front face of the plate through the open top, the bottom surfaces of the sub-casing being bright so as to reflect rays from the light across the face of the plate.

JOHN KISS.